(12) United States Patent
Burckhardt et al.

(10) Patent No.: US 7,580,508 B2
(45) Date of Patent: Aug. 25, 2009

(54) INTEGRATED COLLIMATOR HANDLING SYSTEM AND METHOD

(75) Inventors: Darrell Dennis Burckhardt, Hoffman Estates, IL (US); Grant Albert, Elgin, IL (US); Robert Kasper, Chicago, IL (US)

(73) Assignee: Siemens Medical Solutions, USA, Inc., Malvern, PA (US)

( * ) Notice: Subject to any disclaimer, the term of this patent is extended or adjusted under 35 U.S.C. 154(b) by 606 days.

(21) Appl. No.: 10/951,218

(22) Filed: Sep. 27, 2004

(65) Prior Publication Data

US 2005/0080331 A1   Apr. 14, 2005

(51) Int. Cl.
*G21K 1/02* (2006.01)
(52) U.S. Cl. .................... 378/148; 600/407; 600/436; 250/363.1; 378/195
(58) Field of Classification Search ............... 312/209; 600/436; 378/148, 195, 196, 205; 250/363.01, 250/363.02, 363.03, 363.04, 363.05
See application file for complete search history.

(56) References Cited

U.S. PATENT DOCUMENTS

| | | | | |
|---|---|---|---|---|
| 3,652,852 | A * | 3/1972 | Miyazawa et al. | 378/63 |
| 4,758,726 | A * | 7/1988 | Douma et al. | 250/363.1 |
| 4,865,284 | A * | 9/1989 | Gosis et al. | 248/176.3 |
| 5,519,223 | A * | 5/1996 | Hug et al. | 250/363.1 |
| 6,398,409 | B1 | 6/2002 | Brooks | |
| 6,560,310 | B2 * | 5/2003 | Stark | 378/37 |
| 6,590,214 | B1 | 7/2003 | Karmalawy | |
| 6,906,328 | B2 | 6/2005 | Garrard et al. | |
| 2005/0152503 | A1 | 7/2005 | Rauh | |
| 2005/0276383 | A1 | 12/2005 | Bertram et al. | |
| 2007/0013273 | A1 | 1/2007 | Albert et al. | |

* cited by examiner

*Primary Examiner*—Long V Le
*Assistant Examiner*—Ellsworth Weatherby

(57) ABSTRACT

A collimator handling system for partially or fully automating the task of replacing and storing collimators in nuclear imaging systems. A collimator server stores a set of different collimators in stacked drawers which may be automatically extracted into the detector. The reduction in time spent on these tasks reduces cost and increases throughput. Furthermore, the automation of handling heavy lead (or like) collimators increases technician safety.

8 Claims, 5 Drawing Sheets

INTEGRATED COLLIMATOR HANDLING SYSTEM AND METHOD

BACKGROUND

The invention relates to nuclear medicine imaging systems, and more particularly relates to collimators used with gamma cameras in the detectors of nuclear medicine imaging systems. In its most immediate sense, the invention relates to a method and apparatus for the transfer, removal, mounting and storage of collimators in nuclear medicine imaging systems.

Nuclear medicine imaging assesses the radionuclide distribution within a patient after the in vivo administration of radiopharmaceuticals. Imaging systems that assess radionuclide distribution include radiation detectors and acquisition electronics. The imaging systems detect x-ray or gamma ray photons derived from the administered radionuclides. Single photon emission imaging and coincidence imaging are two forms of nuclear medicine imaging that are currently in common use. In single photon emission imaging, the radionuclide itself directly emits the radiation to be assessed. For example, in Single Photon Emission Computed Tomography (SPECT), y-emitting radionuclides such as $^{99m}$Tc, $^{123}$I, $^{67}$Ga and $^{111}$In may be part of the administered radiopharmaceutical.

Detectors used in such single photon emission imaging often use collimators placed between the patient and the gamma ray camera of the detector. The purpose is to eliminate all photons but those photons traveling in a desired direction. For example, a parallel hole collimator eliminates photons traveling in all directions except those almost perpendicular to the surface of the detector. The energy of emitted photons as well as their location of origin may then be accumulated until a satisfactory image is obtained.

Coincidence imaging eliminates the need for such a collimator by relying on the detection of two photons at different detectors at nearly the same time. An example of coincidence imaging in current clinical use is Positron Emission Tomography (PET).

Radiation detectors used in nuclear medicine imaging need to absorb x- or gamma-ray photons in an energy range typically between 1 keV and several MeV. These imaging photons are the photons either directly emitted or resulting from radionuclides within a patient. In order to stop imaging photons of these energies with a collimator in SPECT imaging, a material with a high density and a high atomic number (Z) is necessary. Lead is the most common material used for collimators, but other materials such as tungsten may also be used.

Radiation detectors for SPECT imaging systems often have the ability to use collimators which may be mounted or removed from the system detectors. These "mountable" detectors are useful because a collimator with a different geometry may yield higher quality images in different situations. Being able to "swap in" a collimator with a specific geometry is thus highly advantageous.

As mentioned above, collimators need to be made of a material with a high density and a high atomic number in order to effectively stop imaging photons. These materials, such as lead, are very heavy. For example, a typical lead collimator may weigh on the order of several hundred kilograms. This high weight creates many problems for the effective and efficient imaging of patients when collimators which are mountable are in use. One problem is the risk of damage to either the gamma camera system within the detector, or even damage the collimator itself, when physically removing or mounting the collimator into the detector. Another problem is the risk of injury to the medical technician performing the mounting or removal of the collimator. Another problem is the time required to remove an old collimator and mount a new one in a detector. These procedures time increase the set up time for a patient scan, and reduce the throughput of patients of an imaging system, a determining factor in the profitability of an imaging system. In addition, transferring a collimator from a storage location to the imaging system may also increase the set up time for a patient scan. Another problem is that bulky and heavy collimators often require additional floor space for storage. Another problem is that removing and mounting collimators often requires that components of an imaging system, such as a patient handling system, be moved from their standard operating position. This also increase the time required for patient setup.

Various attempts have been made to address the above problems. However, none of the currently available solutions adequately address the problems of using mountable collimators. Their remains a need in the nuclear medicine imaging art for systems and methods of reducing the danger, time, space, and expense of using modular collimators.

BRIEF DESCRIPTION OF THE DRAWINGS

The above description, as well as further objects, features and advantages of the present invention will be more fully understood with reference to the following detailed description of the preferred embodiments, when taken in conjunction with the accompanying drawings, wherein.

DETAILED DESCRIPTION

Figure 1:
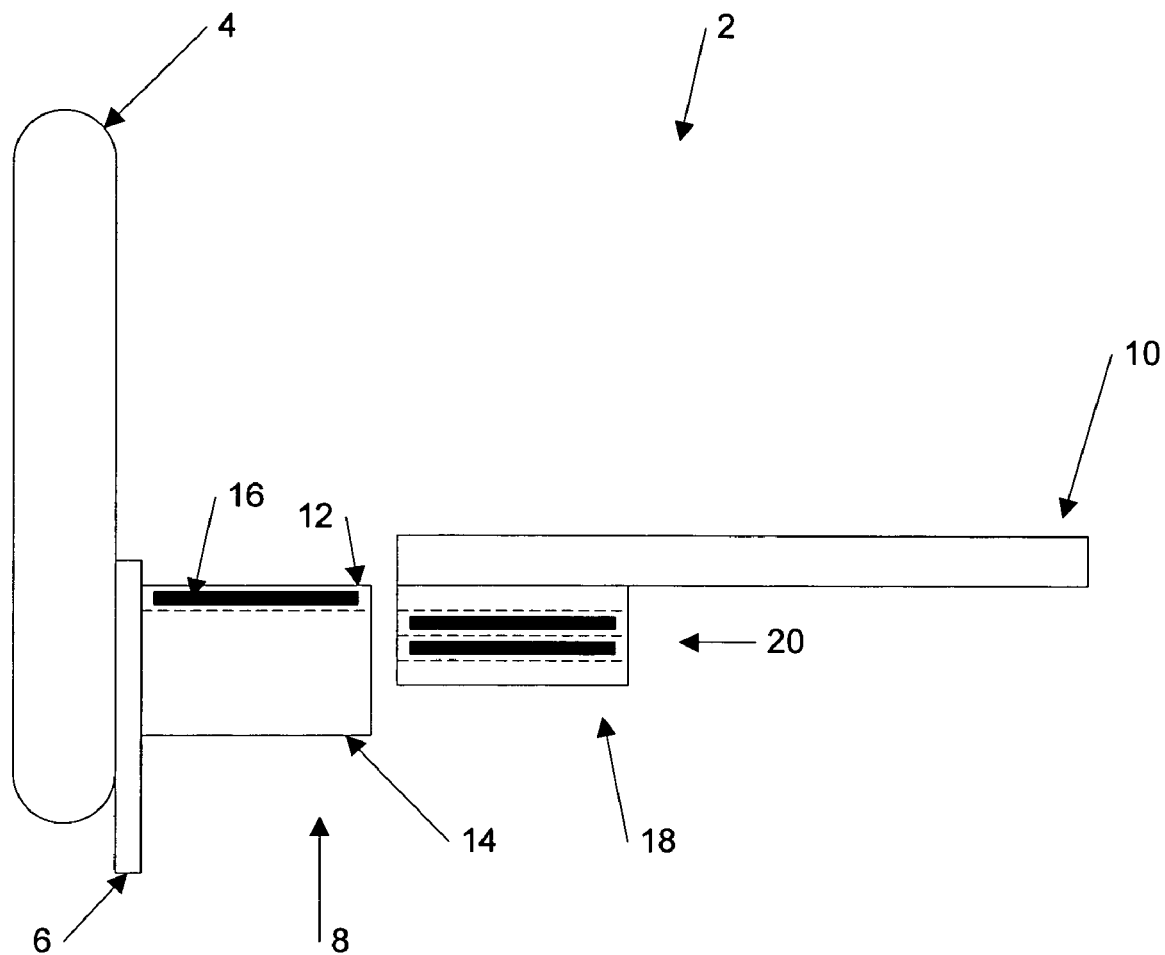
FIG. 1 is a side view of an embodiment of the present invention implemented a nuclear medicine imaging system.

FIG. 1 shows a nuclear medicine imaging system 2 illustrating one embodiment of the present invention. The imaging system 2 includes a gantry 4, a rail 6, a detector 8, and a patient handling system 10. The detector 8 includes a collimator slot 12 and a gamma camera 14. The collimator slot is filled with a first collimator 16. The gantry 4 is capable of rotating the detector 8 around the center line of the gantry 4, and the rail 6 allows the detector 8 to be moved toward and away from the center line of gantry 4.

The patient handling system 10 includes a collimator server 18 integrated into the patient handling system 10. The collimator server 18 may have a number of different forms. In this particular embodiment, it includes a number of drawers 20. Each drawer may contain a single collimator, or may be empty.

Figure 2:
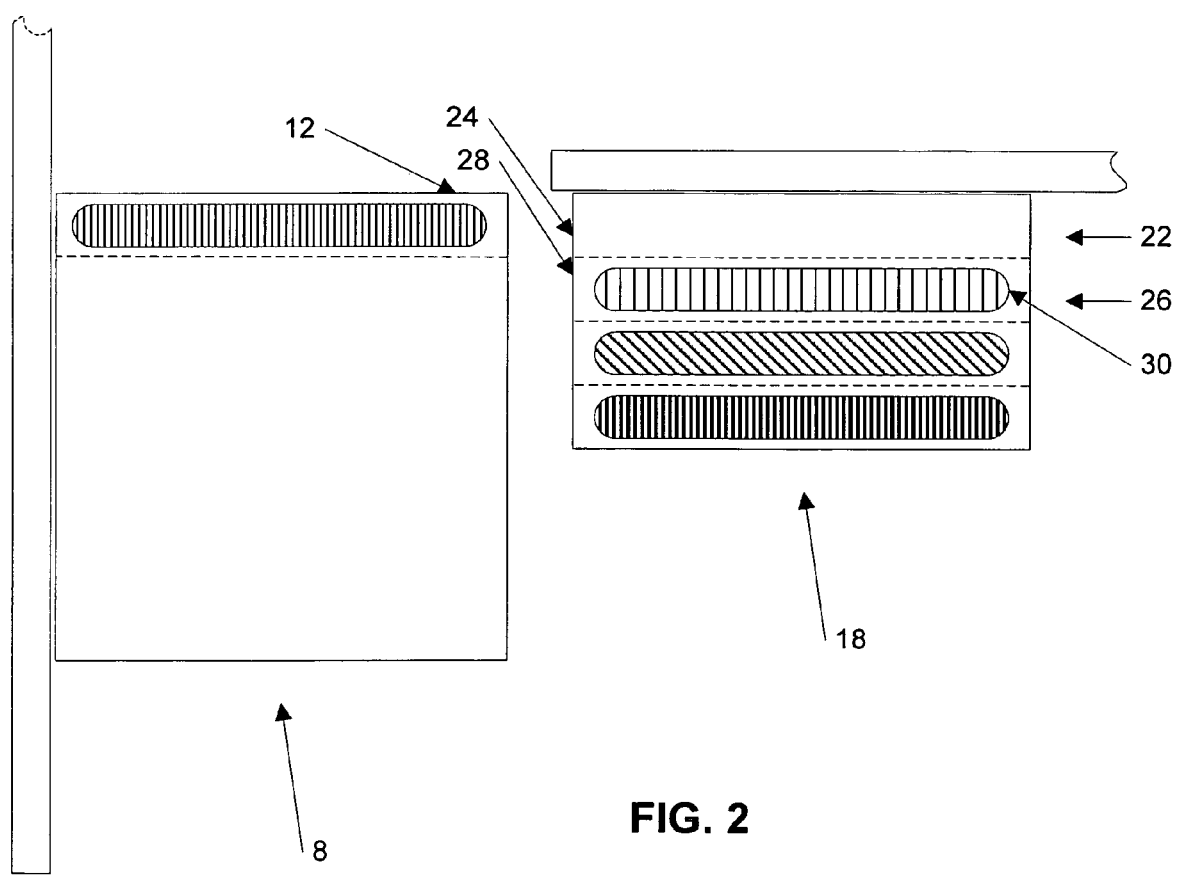
FIG. 2 shows an enlarged side view of a the embodiment of FIG. 1.

FIG. 2 shows an enlarged view of the embodiment of the present invention of FIG. 1. wherein like numbers indicate like components, the collimator server 18 and the detector 8 are shown in detail. The first drawer 22 is shown empty. The first drawer 22 has a front 24. The second drawer 26 has a front 28. It contains a second collimator 30. The first drawer 22 is shown aligned with the collimator slot 12.

Figure 3:
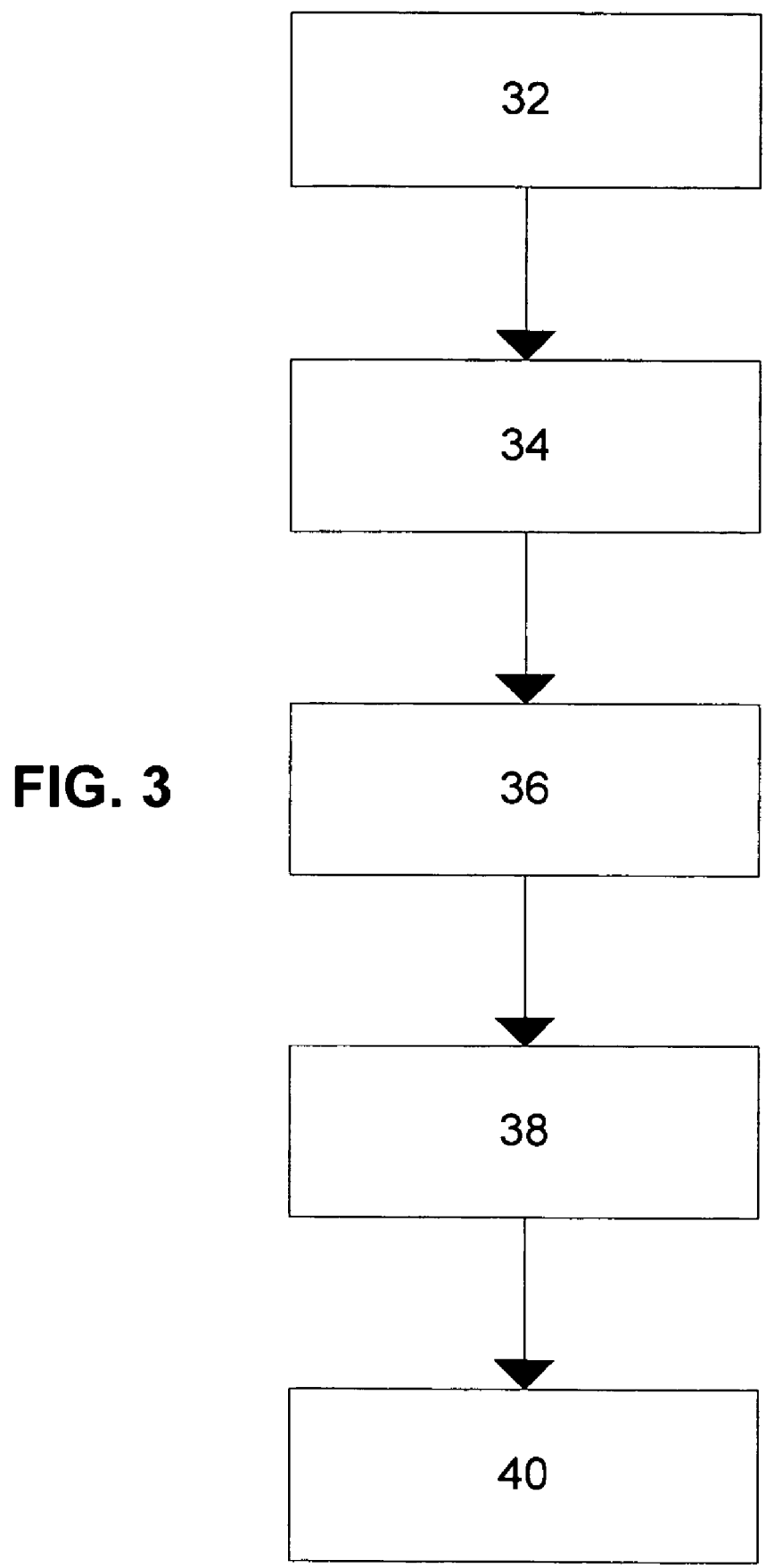
FIG. 3 is a flow chart for the procedure of removing a collimator using the embodiment of the present invention shown in FIG. 1.

FIG. 3 is a flow chart of the steps necessary to remove first collimator 16 from collimator slot 12. In step 32 the collimator slot 12 of detector 8 is aligned with the empty first drawer 22 of collimator server 18. This alignment occurs in both rotation (around gantry 4) and translation (along rail 6). In step 34, the front 24 of the drawer 22 opens. In step 36, the first collimator 16 is unclamped from the detector 8. In step 38, the first collimator 16 is lifted from collimator slot 12 into drawer 22. In step 40 the front 24 of drawer 22 is closed.

Figure 4:
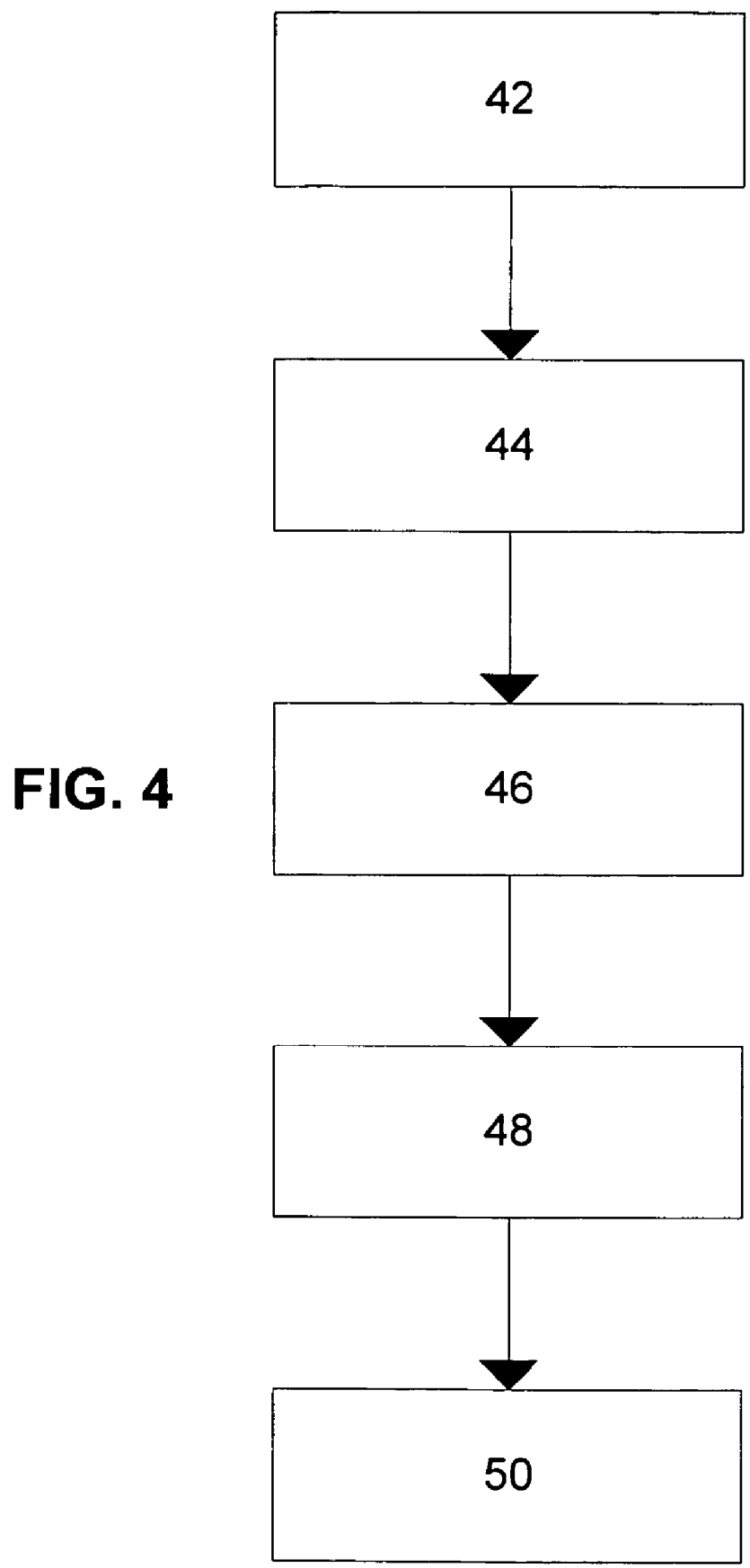
FIG. 4 is a flow chart for the procedure of mounting a collimator using the embodiment of the present invention shown in FIG. 1.

FIG. 4 is a flow chart of the steps necessary to mount the second collimator 24 into collimator slot 12. In step 42 the collimator slot 12 is aligned with second drawer 26. If this is performed directly after step 40, only translation of detector 8 along rail 6 will be necessary, Otherwise, both rotation and translation will be necessary. In step 44, the front 28 of drawer 26 opens. In step 46 the second collimator 30 is lifted from the second drawer 26 onto collimator slot 12. In step 48 the front 28 of second drawer 26 closes. In step 50, the second collimator 30 is clamped into the collimator slot 12.

The above steps do not assume manual or automatic function. Each step could be performed manually, triggered manually, or performed automatically at the request of a program. Thus either procedure can either be manual, automatic or (likely) having both manual and automatic aspects. Note that if a step is performed manually, an additional step by the imaging system's control system is necessary to check to see if and when that step is performed. For example, if in step 44 the drawer 28 is opened manually, there should be a step 49 of the control system of the nuclear medicine imaging system 2 sensing the drawer 28 has been opened. This allows any automatic functions and fail safes to remain coordinated.

The exact mechanical mechanism for the lifting of the first collimator 16 in step 38 or the second collimator 30 in step 46 is an implementation detail well understood by those skilled in the art. Both hydraulic and electro-mechanical systems could be used to implement the lifting of collimators.

The above system and methods are easily applicable systems with two or more detectors. The above delineated steps would be repeated with appropriate checks.

The above system and methods provide for the swapping of a number of collimators for a single detector. The number of collimators would be limited to the number of drawers in the collimator server 18. The embodiment of the present invention addresses many of the problems mentioned hereinabove. The chance of damaging the collimator, the detector, and of injuring the medical technician in such a controlled system is substantially reduced. The time required to both mount and remove a collimator from a detector is substantially reduced, improving patient throughput. The amount of additional floor space needed for mounting and removing collimators is substantially minimized by integrating the collimator server 18 with the patient handling system 10. Additionally, integrating the collimator server 18 into the patient handling system 10 allows the mounting or removing of collimators without moving components the nuclear medicine imaging system out of standard operating positions.

Figure 5:
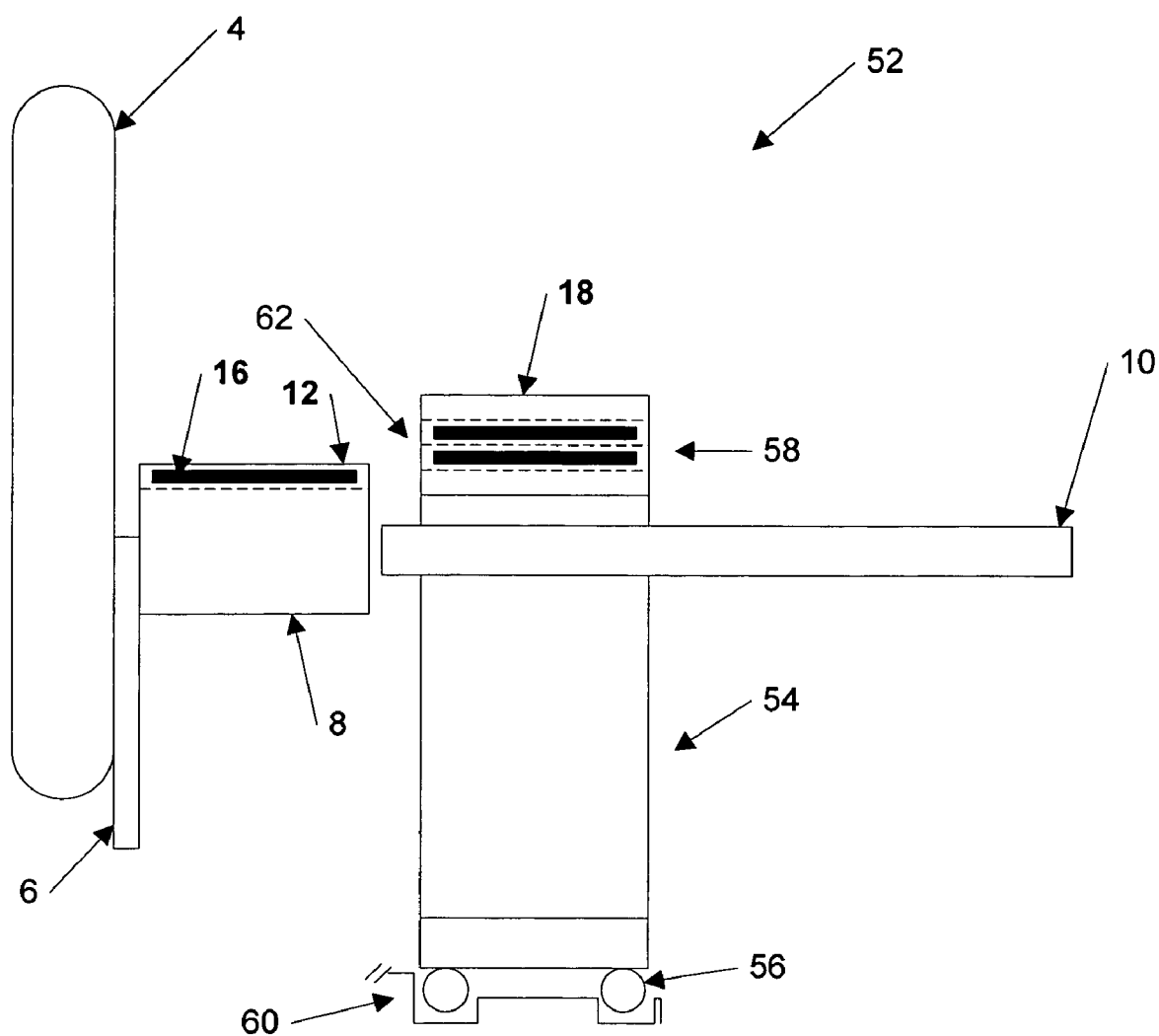
FIG. 5 shows another embodiment of the present invention.

Another embodiment of the present invention is shown in FIG. 5. Note that like numbers represent like components. The nuclear medicine imaging system 52 is shown with collimator cart 54. The collimator cart 54 supplements the collimator server 18 by allowing other collimators to be mounted onto the detector 8 which are not currently loaded in the collimator server 18. The collimator cart 54 has wheels 56 for ease of transport of heavy collimators. Collimator cart 54 is docked from a side of patient handling system 10. FIG. 5 shows the drawers 58 of collimator cart 54 are positioned above the patient handling system 10. The detector 8 is aligned as above in step 32. This precision alignment is possible because docking aligner 60 forces the rigid cart into a fixed, known position. The front 62 of drawers 58 are positioned toward the gantry 4. In all other ways the method of removing and mounting collimators is the same.

The collimator cart 56 allows for storage of collimators in a space efficient manner. Collimator cart 56 also allows the transport of collimators in a time efficient, space efficient, and safe manner. The docking ability of collimator cart 56 allows use of same advantages of mounting and removal as discussed for collimator server 18.

A further advantage of the collimator cart 56 may be realized in yet another embodiment of the present invention, wherein collimator cart 56 can be docked from the other side of patient handling system 10 such that the fronts 62 of drawers 58 face away from the gantry and towards the front of collimator server 18. This allows for the direct transfer of collimators from the collimator cart 56 to the collimator server 18.

As these and other variations and combinations of the features discussed above can be utilized, the foregoing description of the preferred embodiments should be taken by way of illustration rather than by limitation of the invention set forth in the claims.

What is claimed is:

1. A nuclear medicine imaging system comprising:
   a. a gantry,
   b. a detector attached to said gantry, having a gamma camera system and a collimator slot,
   c. a patient handling system, and
   d. a collimator server integrated into the patient handling system, holding a number of collimators,
   e. wherein the collimator is configured to:
      i. mount collimators into the collimator slot,
      ii. remove collimators from the collimator slot, and
      iii. store collimators.

2. The nuclear medicine imaging system of claim 1, wherein the collimator server further comprises:
   a. a number of drawers,
   b. each of the number of drawers being capable of holding one collimator, and
   c. each of the number of drawers having a front, each front capable of being opened.

3. The nuclear medicine imaging system of claim 1, further comprising:
   a. a collimator cart, including
      i. a number of drawers,
      ii. each of the number of drawers being capable of holding one collimator, and
      iii. each of the number of drawers having a front, each front capable of being opened.

4. A method of mounting a collimator onto a detector of a nuclear medicine imaging system, comprising:
   a. aligning a collimator slot of a detector with a drawer of a collimator server that is integrated into a patient handling system,
   b. opening the drawer of the collimator server,
   c. lifting the collimator from the drawer of the collimator server to the collimator slot of the detector, and
   d. clamping the collimator into the collimator slot of the detector.

5. A method of removing a collimator from a detector of a nuclear medicine imaging system, comprising:
   a. aligning a collimator slot of a detector with a drawer of a collimator server that is integrated into a patient handling system,
   b. opening the drawer of the collimator server,
   c. unclamping the collimator from the collimator slot of the detector, d. lifting the collimator from the collimator slot of the detector drawer of the collimator server, and e. closing the drawer of the collimator server.

6. A method of mounting a collimator from a portable collimator cart having a plurality of vertically stacked drawers onto a detector of a nuclear medicine imaging system having a gantry on which said detector is supported, comprising:

a. providing a collimator server integrated into a patient handling system of said nuclear medical imaging system, b. docking said collimator cart onto a docking mechanism of the nuclear medicine imaging system, wherein docking the cart positions the cart in lateral alignment with said detector such that said drawers are positioned to open in a direction toward said gantry, c. vertically aligning a collimator slot of a detector with a drawer of said collimator cart, d. opening the drawer of the collimator cart, e. lifting the collimator from the drawer of the collimator cart to the collimator slot of the detector, and f. clamping the collimator into the collimator slot of the detector.

7. The nuclear medicine imaging system of claim 3, wherein said collimator cart further comprises a plurality of wheels.

8. The nuclear medicine imaging system of claim 7, further comprising a docking aligner that aligns said collimator cart with said detector by forcing said wheels into a fixed position with respect to said gantry.

* * * * *